US012695237B2

(12) United States Patent
Kumakura et al.

(10) Patent No.: US 12,695,237 B2
(45) Date of Patent: Jul. 28, 2026

(54) CONNECTOR, CONNECTOR MANUFACTURING METHOD, AND WIRE HARNESS

(71) Applicant: YAZAKI CORPORATION, Tokyo (JP)

(72) Inventors: Hideto Kumakura, Makinohara (JP); Takuya Ohashi, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 191 days.

(21) Appl. No.: 18/663,049

(22) Filed: May 13, 2024

(65) Prior Publication Data

US 2024/0421528 A1 Dec. 19, 2024

(30) Foreign Application Priority Data

Jun. 16, 2023 (JP) ................................ 2023-098907

(51) Int. Cl.
*H01R 13/514* (2006.01)
*H01R 43/20* (2006.01)

(52) U.S. Cl.
CPC .......... *H01R 13/514* (2013.01); *H01R 43/20* (2013.01)

(58) Field of Classification Search
CPC ............................ H01R 13/514; H01R 43/20
USPC ........................................................ 174/72 A
See application file for complete search history.

(56) References Cited

U.S. PATENT DOCUMENTS

2019/0173220 A1* 6/2019 Bhat .................. H01R 13/4362
2024/0332842 A1* 10/2024 Osawa .............. H01R 13/5208

FOREIGN PATENT DOCUMENTS

JP 2022-2194 A 1/2022

* cited by examiner

*Primary Examiner* — Timothy J Thompson
*Assistant Examiner* — Guillermo J Egoavil
(74) *Attorney, Agent, or Firm* — KENEALY VAIDYA LLP

(57) ABSTRACT

A connector includes: a plurality of terminal-attached electric wires in each of which a terminal is attached to an electric wire in a direction intersecting an extending direction of the electric wire; and a housing including a plurality of compartments that holds the terminal in a fitting direction, and a plurality of electric wire insertion portions that is provided penetrating a side wall portion and configured to extract the electric wire in the plurality of terminal-attached electric wires from an internal space in a direction intersecting the fitting direction. The housing has guide portions provided between individual accommodating regions for the plurality of terminal-attached electric wires arrayed and accommodated in the internal space. The guide portion has an inclined surface inclined with respect to the extending direction of the electric wire.

3 Claims, 7 Drawing Sheets

CONNECTOR, CONNECTOR MANUFACTURING METHOD, AND WIRE HARNESS

CROSS-REFERENCE TO RELATED APPLICATION(S)

The present application claims priority to and incorporates by reference the entire contents of Japanese Patent Application No. 2023-098907 filed in Japan on Jun. 16, 2023.

BACKGROUND OF THE INVENTION

1. Field of the Invention

The present invention relates to a connector, a connector manufacturing method, and a wire harness.

2. Description of the Related Art

As a conventional technology related to a connector, a connector manufacturing method, and a wire harness, there is known, for example, a connector that holds a plurality of terminal-attached electric wires by a housing, as described in Japanese Patent Application Laid-open No. 2022-002194 A. This connector directs its terminal in a fitting direction with a mating connector, allowing the electric wire to be extracted in a direction intersecting the fitting direction. That is, the terminal-attached electric wires are provided to allow the terminal to face in a direction intersecting an extending direction of the electric wire.

Such a connector has room for improvement in having a difficulty assembling the terminal-attached electric wire to the housing. For example, the terminal-attached electric wire has its electric wire and the terminal directed intersecting each other to form an L shape, making it difficult to insert the terminal-attached electric wire into the housing through an electric wire insertion hole.

SUMMARY OF THE INVENTION

In view of this, an object of the present invention is to provide a connector, a connector manufacturing method, and a wire harness capable of smoothly assembling a terminal-attached electric wire to a housing.

In order to achieve the above mentioned object, a connector according to one aspect of the present invention includes a plurality of terminal-attached electric wires in each of which a terminal is attached to an electric wire in a direction intersecting an extending direction of the electric wire; and a housing including a front surface portion formed in a direction intersecting a fitting direction of the connector to a mating connector, a side wall portion having a frame shape and provided along an outer edge portion of the front surface portion, an internal space defined by the front surface portion and the side wall portion and capable of accommodating the plurality of terminal-attached electric wires arrayed along the front surface portion, a plurality of compartments each of which accommodates and holds the terminal of the plurality of arrayed terminal-attached electric wires in the fitting direction, and a plurality of electric wire insertion portions each having a cylindrical shape and provided to penetrate the side wall portion and configured to extract the electric wires of the plurality of terminal-attached electric wires from the internal space in the direction intersecting the fitting direction, wherein the housing includes a guide portion provided between individual accommodating regions for the plurality of terminal-attached electric wires to be arrayed and accommodated in the internal space, the guide portion includes an inclined surface inclined with respect to the extending direction of the electric wire, and the inclined surface is inclined so as to be separated from an inner surface of the front surface portion from the electric wire insertion portion toward the compartment.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described below in detail with reference to the drawings. Note that the present invention is not limited by the embodiment. Moreover, components in the following embodiment include those easily interchangeable by those skilled in the art or substantially identical.

EMBODIMENT

The present embodiment relates to a connector, a connector manufacturing method, and a wire harness. The following description uses a first direction, a second direction, and a third direction intersecting each other, in which the first direction is referred to as a "connecting direction X", the second direction is referred to as a "width direction Y", and the third direction is referred to as a "height direction Z". The connecting direction X, the width direction Y, and the height direction Z are orthogonal to each other. The connecting direction X corresponds to a connecting direction and a fitting direction regarding the connector and its mating connector. The width direction Y and the height direction Z correspond to an intersecting direction, being a direction intersecting the connecting direction X. Unless otherwise specified, each direction used in the following description will be given as a direction in a state where the individual portions are assembled to each other. The term "orthogonal" as used herein includes substantially orthogonal.

Figure 1:
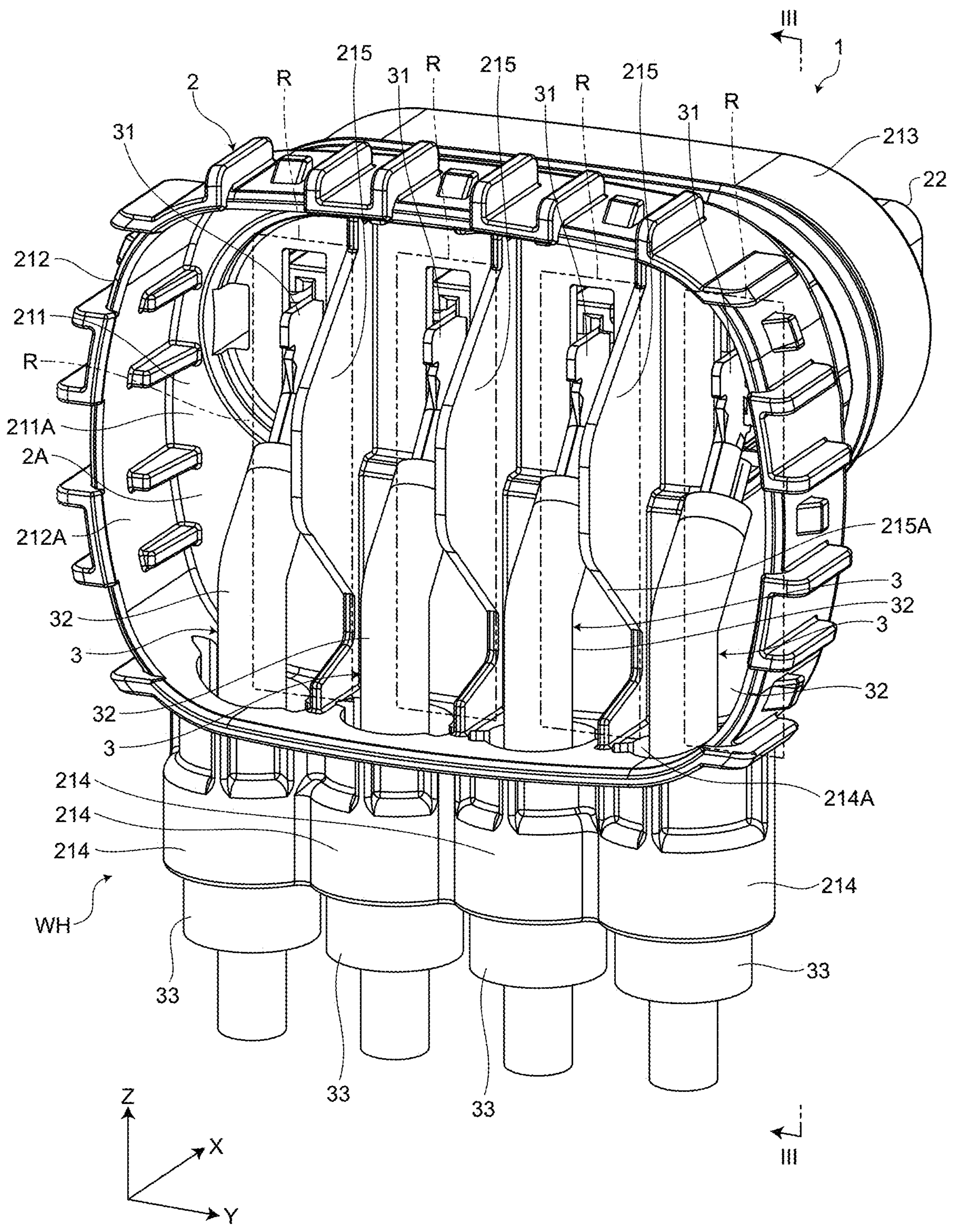
FIG. 1 is a perspective view illustrating a connector according to an embodiment.
Figure 2:
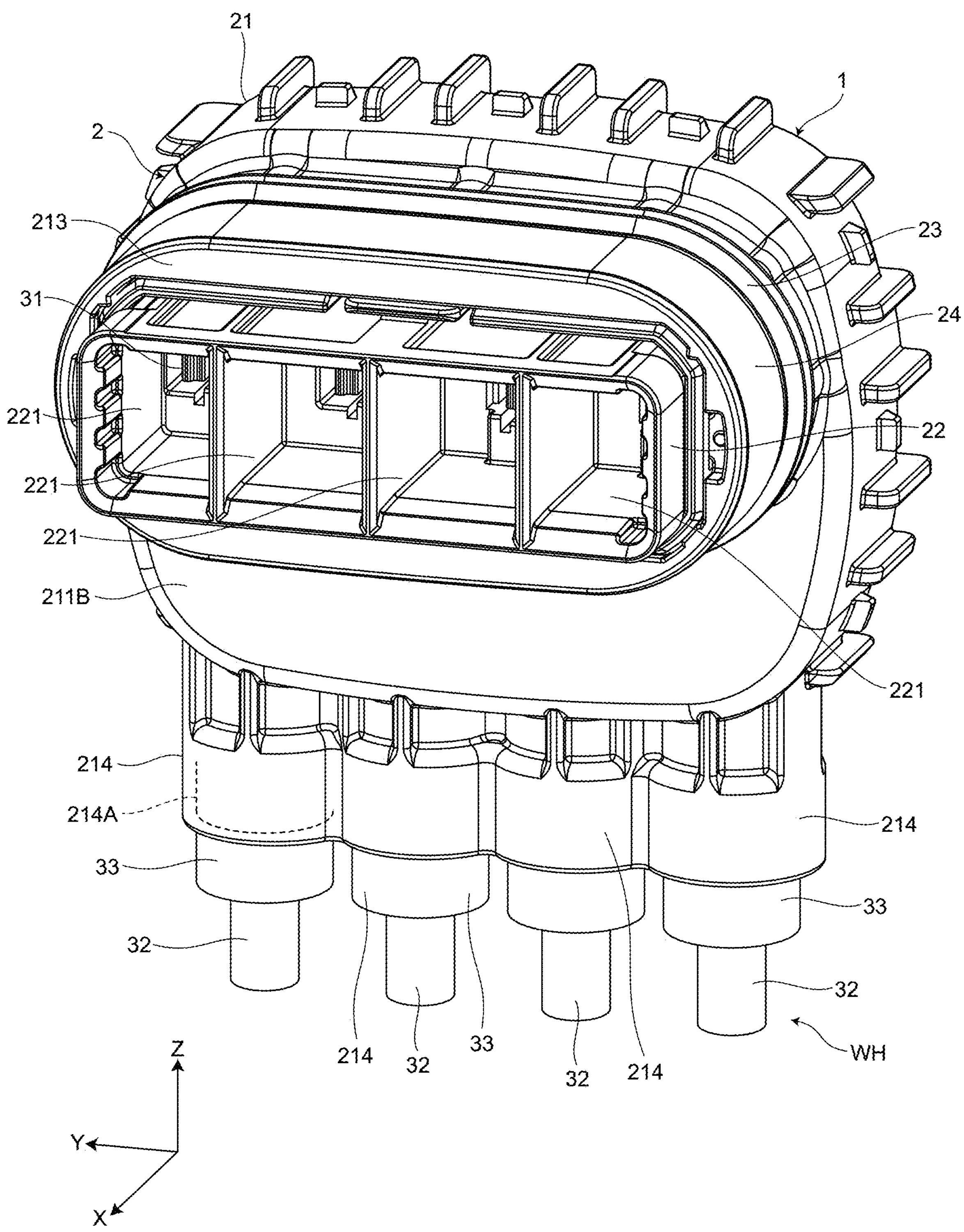
FIG. 2 is a perspective view illustrating the connector according to the embodiment.

As illustrated in FIGS. 1 and 2, a connector 1 is a connector used for connection with a mating connector, and includes a housing 2 and a terminal-attached electric wire 3. The connector 1 is mounted on a vehicle, for example, and is used as a component of a wire harness WH. That is, the wire harness WH includes the connector 1 and an electric wire 32 extracted from the connector 1. For convenience of description, FIGS. 1 and 2 omit illustrations of a cover attached to the back of the housing 2. The mating connector may function as a mating housing.

The housing 2 is a member that accommodates and holds the terminal-attached electric wire 3, and includes an outer housing 21 and an inner housing 22, for example. The outer housing 21 is a member that accommodates and holds a plurality of the terminal-attached electric wires 3, and is formed in a box shape with a back portion opened. For example, the outer housing 21 has a front surface portion 211 and a side wall portion 212. The front surface portion 211 is a plate member formed in a direction intersecting the connecting direction X (fitting direction) with the mating connector, and is formed in a rectangular shape or a substantially rectangular shape, for example. The side wall portion 212 is a wall member formed along an outer edge portion of the front surface portion 211, and extends in the connecting direction X from an inner surface 211A of the front surface portion 211. The side wall portion 212 is formed as a rectangular or substantially rectangular frame body, for example, and defines an internal space 2A of the housing 2, together with the front surface portion 211. The side wall portion 212 may be formed as a frame body having a shape other than a rectangle.

The housing 2 has a fitting portion 213. The fitting portion 213 is a portion to be fitted to the mating connector, and is formed to protrude in the connecting direction X from an outer surface 211B of the front surface portion 211. The fitting portion 213 is, for example, a cylindrical body having an elliptical cross section or an oval cross section. The inner housing 22 is assembled to the fitting portion 213. The inner housing 22 is a member having a block shape that accommodates and holds a terminal 31 of the terminal-attached electric wire 3, and includes a plurality of compartments 221 that each accommodates the plurality of terminals 31. For example, four compartment 221 are provided corresponding to four terminals 31, and are adjacent to each other in the width direction Y. The compartment 221 is formed with an accommodation hole into which the terminal 31 is inserted, and can accommodate the terminal 31 in a fitting direction with respect to the mating connector.

There are provided a seal 23 and a holder 24 on an outer circumference of the fitting portion 213. The seal 23 is a waterstop member that performs water stop between the connector 1 and the mating connector, and is formed of an annular elastic member, for example. The holder 24 is a member that holds the seal 23, and is formed of an annular member having higher rigidity than the seal 23, for example.

The housing 2 is provided with an electric wire insertion portion 214. The electric wire insertion portion 214 is a portion through which the electric wire 32 of the terminal-attached electric wire 3 accommodated in the housing 2 is to be extracted to the outside of the housing 2, and functions as an insertion path of the terminal-attached electric wire 3 when the terminal-attached electric wire 3 is assembled. The electric wire insertion portions 214 are provided in accordance with the number of installed terminal-attached electric wires 3. For example, four electric wire insertion portions 214 are provided for four terminal-attached electric wires 3. The electric wire insertion portion 214 has a cylindrical shape and is formed to penetrate the side wall portion 212. That is, the electric wire insertion portion 214 forms an insertion hole 214A so as to allow the internal space 2A and the outside to communicate with each other through the insertion hole 214A. The electric wire insertion portion 214 is provided in a direction intersecting the fitting direction (connecting direction X) so as to allow the electric wire 32 to be extracted in a direction intersecting the fitting direction.

The terminal-attached electric wires 3 are accommodated in the internal space 2A of the housing 2 so as to be laterally arrayed in a direction intersecting the fitting direction. The terminal-attached electric wire 3 has the terminal 31 housed in the compartment 221 of the inner housing 22 while having the electric wire 32 extracted to the outside through the electric wire insertion portion 214.

The housing 2 is provided with a guide portion 215. The guide portion 215 is a portion that guides the terminal 31 when the terminal-attached electric wire 3 is assembled into the housing 2. The guide portion 215 is provided between individual accommodating regions R for the plurality of terminal-attached electric wires 3 arrayed and housed in the internal space 2A. As illustrated in FIG. 1, when the four terminal-attached electric wires 3 are arrayed, three guide portions 215 are provided. For example, the guide portion 215 has a plate shape and protrudes from the inner surface 211A of the front surface portion 211 so as to be formed in the extending direction of the electric wire 32. The guide portion 215 also functions as a partition that suppresses contact between the terminals 31 adjacent to each other.

The guide portion 215 forms an inclined surface 215A inclined with respect to the extending direction of the electric wire 32. The inclined surface 215A is inclined so as to be separated from the inner surface 211A of the front surface portion 211 from the electric wire insertion portion 214 toward the compartment 221. That is, the inclined surface 215A guides the terminal 31 of the terminal-attached electric wire 3 inserted through the electric wire insertion portion 214 so as to be separated from the front surface portion 211.

Figure 3:
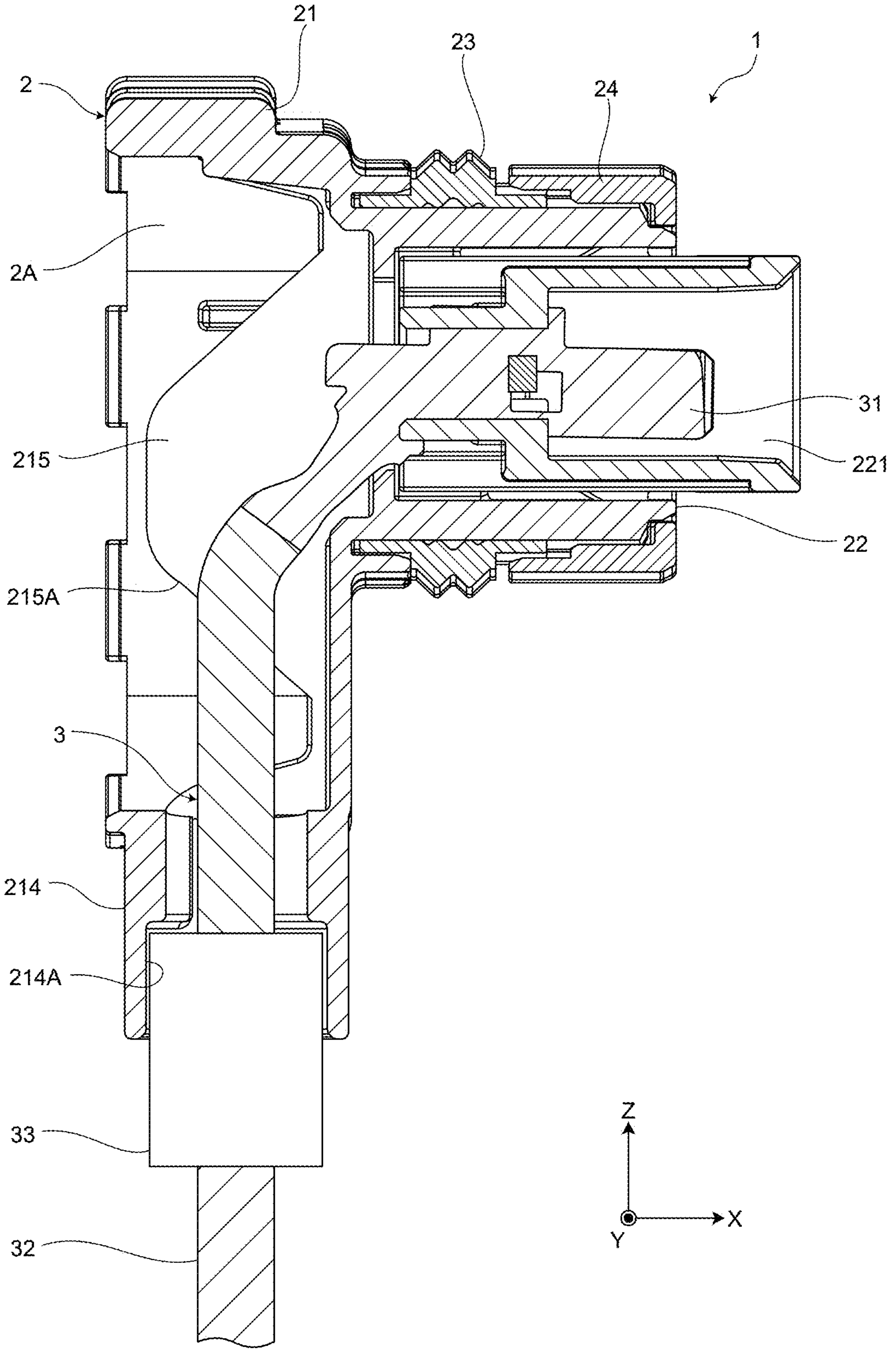
FIG. 3 is a cross-sectional view of the connector taken along line III-III of FIG. 1.

As illustrated in FIG. 3, the terminal-attached electric wire 3 has a bent shape in a direction in which the terminal 31 intersects the electric wire 32, and is formed in an L shape. That is, in a state where the terminal-attached electric wire 3 is assembled to the housing 2, the electric wire 32 is directed in a direction intersecting the connecting direction X, while the terminal 31 is directed in the connecting direction X. The terminal 31 is bent at a right angle when being attached to the electric wire 32, for example. The right angle referred to herein also includes a substantially right angle. With this configuration, it is difficult for the terminal-attached electric wire 3 to be inserted into the electric wire insertion portion 214 and assembled to the housing 2. An example of the terminal 31 is a crimp terminal crimped and attached to the electric wire 32. In addition, the terminal 31 may be attached to the electric wire 32 to function as a bus bar. An example of the electric wire 32 is a coated electric wire in which a core wire being a conductor is coated with an insulating member.

The electric wire 32 is provided with a waterstop 33. The waterstop 33 is a waterstop structure provided on the outer circumference of the electric wire 32, and is provided at the position corresponding to the electric wire insertion portion 214. The waterstop 33 is a structure that performs water stop between the housing 2 and the electric wire 32, and includes a seal, for example. In addition, the waterstop 33 may include a cylindrical shield terminal. In this case, the waterstop 33 may include a seal to stop water between the housing 2 and the shield terminal, and a seal to stop water between the electric wire 32 and the shield terminal.

Next, a method of manufacturing the connector 1 according to the present embodiment will be described.

Figure 4:
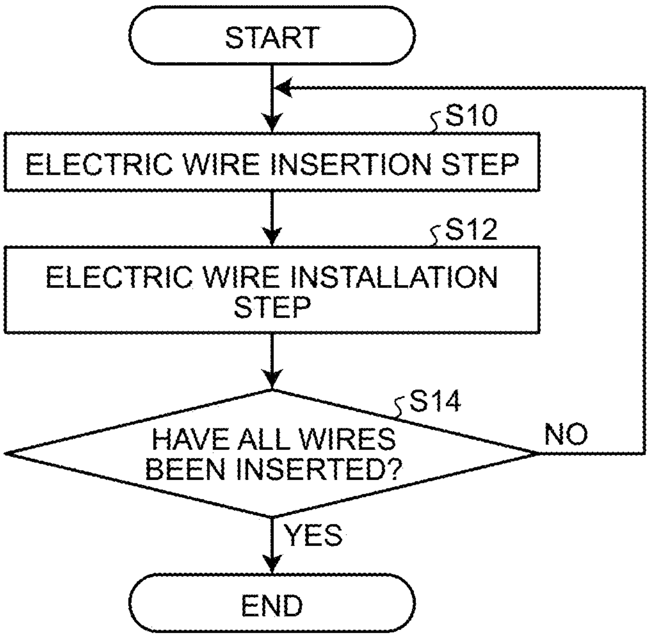
FIG. 4 is a flowchart illustrating a connector manufacturing method according to the embodiment.

FIG. 4 is a flowchart illustrating a method of manufacturing the connector 1 according to the present embodiment. Each step of the flowchart of FIG. 4 may be performed by manual work of an operator, or may be executed under automated control of a manufacturing device such as a robot arm.

Manufacturing of the connector 1 is started, in step S10 (hereinafter, simply referred to as "S10", the similar applies to steps subsequent to S10), as an electric wire insertion step. The electric wire insertion step is a step of sequentially inserting the terminal-attached electric wire 3 into each of the plurality of electric wire insertion portions 214.

Figure 5:
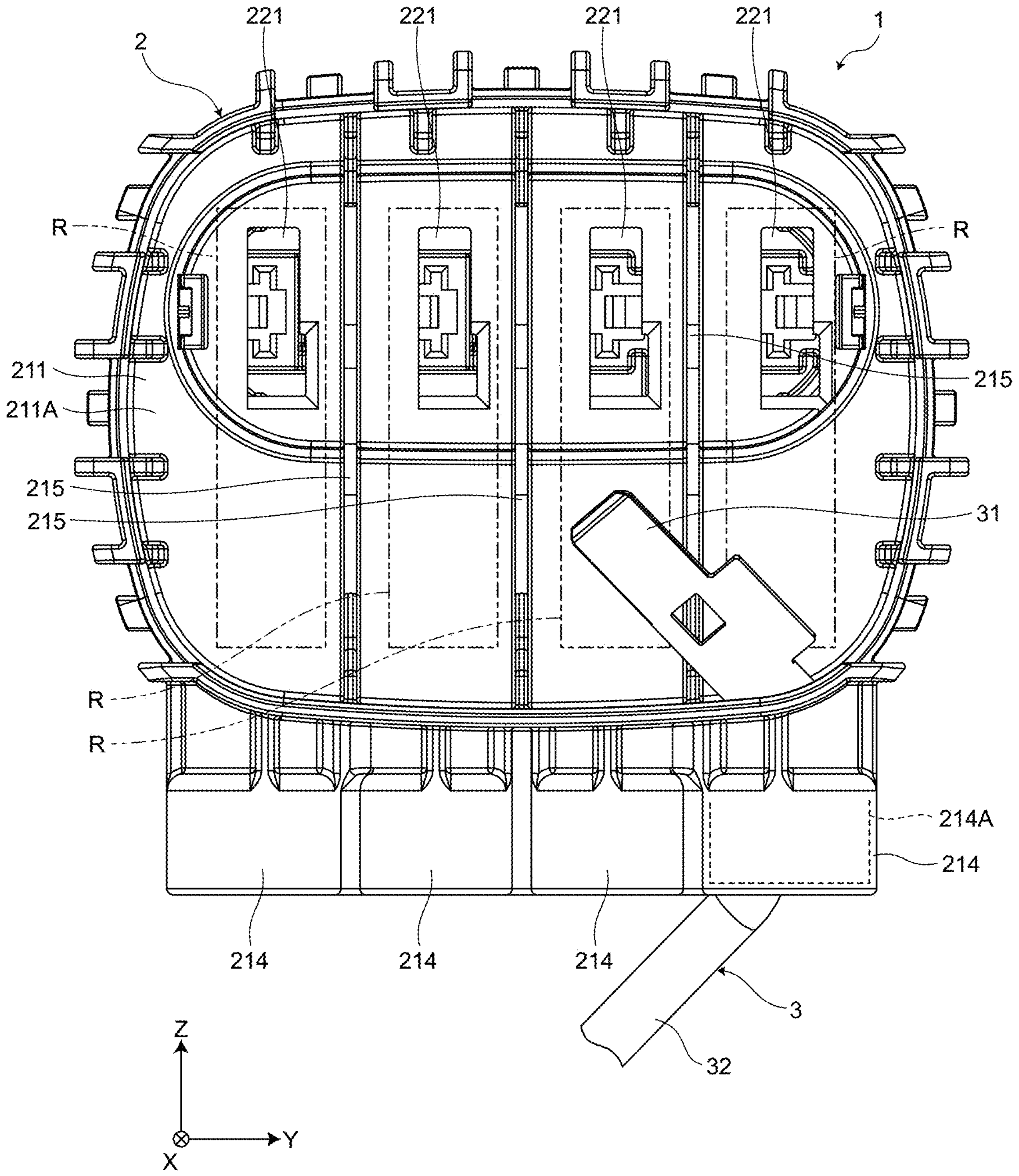
FIG. 5 is a view illustrating an electric wire insertion step in the connector manufacturing method according to the embodiment.

As illustrated in FIG. 5, in the electric wire insertion step, starting with the terminal 31 as a head, the terminal-attached electric wire 3 is inserted into the electric wire insertion portion 214. Having a structure in which the terminal 31, which is in a bent state, is attached to the electric wire 32, the terminal-attached electric wire 3 is inserted into the electric wire insertion portion 214 with the electric wire 32 directed, in an inclined state, toward the electric wire insertion portion 214. That is, the terminal-attached electric wire 3 is inserted into the electric wire insertion portion 214 such that the terminal 31 faces the guide portion 215.

Figure 6:
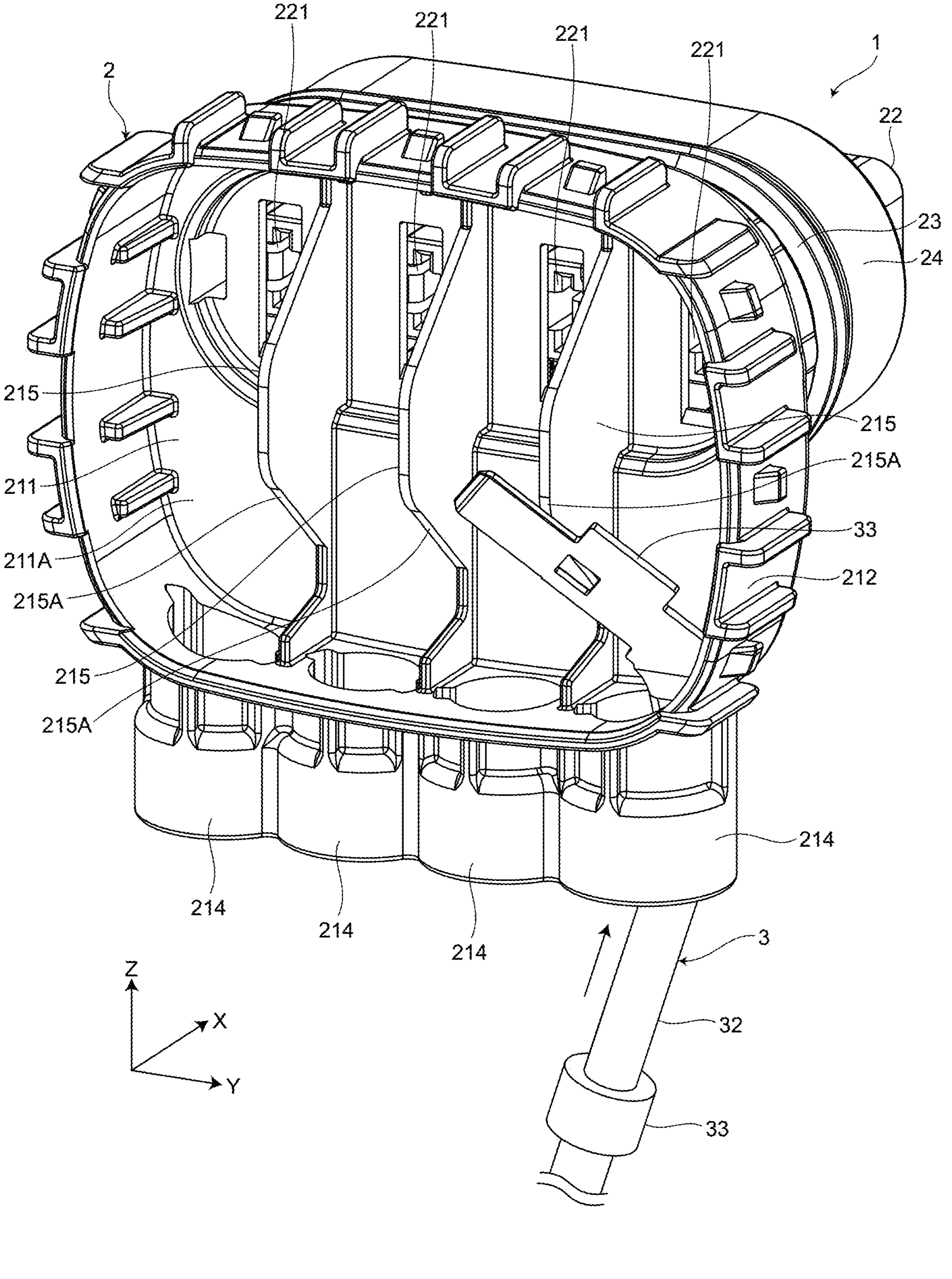
FIG. 6 is a view illustrating an electric wire insertion step in the connector manufacturing method according to the embodiment.

As illustrated in FIG. 6, when the terminal 31 is inserted through the electric wire insertion portion 214, the terminal 31 abuts on the guide portion 215 and is guided, by the guide portion 215, to be separated from the inner surface 211A of the housing 2. That is, the terminal 31 comes into contact with the inclined surface 215A of the guide portion 215 and separates from the inner surface 211A. This prevents the terminal 31 from hitting the inner surface 211A, the adjacent electric wire 32, or the like. In addition, since the terminal 31 is separated from the inner surface 211A of the front surface portion 211, the terminal 31 can be easily gripped.

Figure 7:
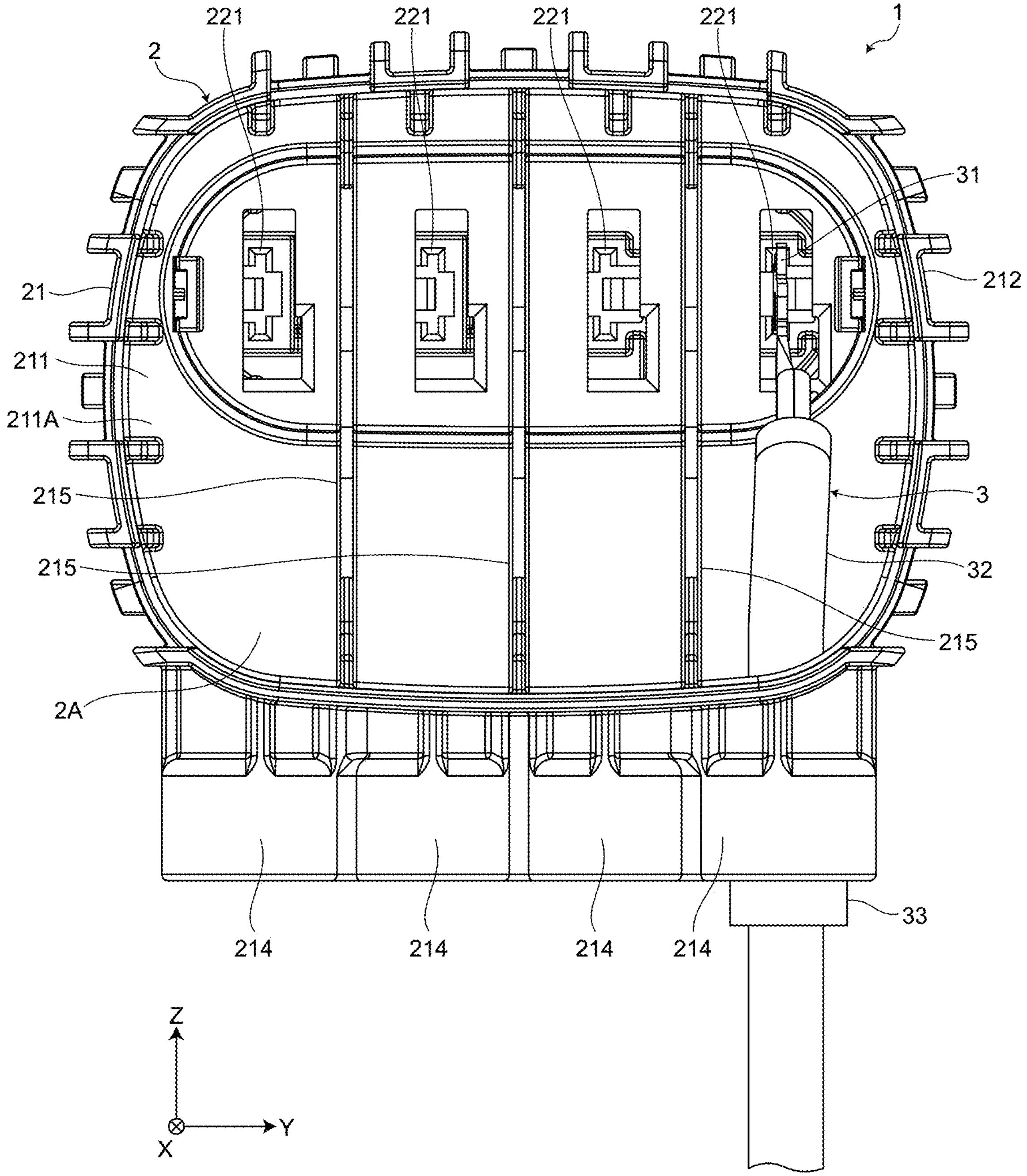
FIG. 7 is a view illustrating an electric wire installation step in the connector manufacturing method according to the embodiment.

The step proceeds to S12 of FIG. 4, in which an electric wire installation step is performed. The electric wire installation step is a step of accommodating the terminal 31 of the terminal-attached electric wire 3 inserted through the electric wire insertion portion 214, into the compartment 221. That is, as illustrated in FIG. 7, in the electric wire installation step, the terminal 31 of the terminal-attached electric wire 3 is directed toward the compartment 221 and accommodated in the compartment 221. With this operation, the terminal 31 is directed in the connecting direction X (fitting direction), and the terminal-attached electric wire 3 is installed in the accommodating region R. At this time, since the terminal 31 is at a position separated from the inner surface 211A in the electric wire insertion step of S10, the terminal 31 can be easily gripped. This facilitates accommodation of the terminal 31, making it possible to smoothly perform the electric wire installation step.

The step proceeds to S14 of FIG. 4, in which it is determined whether all the terminal-attached electric wires 3 have been inserted into the electric wire insertion portion 214. For example, when not all the four terminal-attached electric wires 3 have been inserted, the step returns to the electric wire insertion step of S10. That is, the electric wire insertion step in S10 and the electric wire arrangement step in S12 are sequentially repeated. The electric wire insertion step for the second and subsequent pieces of the terminal-attached electric wires 3 is performed by inserting the terminal-attached electric wire 3 into an empty portion being the electric wire insertion portion 214 and allowing the terminal 31 to abut on the inclined surface 215A of the guide portion 215 as described above. The terminal-attached electric wire 3 is sequentially inserted into the empty electric wire insertion portion 214 so as to install the terminal-attached electric wire 3 in the accommodating region R. This completes, as illustrated in FIG. 1, installation of all the terminal-attached electric wires 3 arrayed in the accommodating region R.

Completion of insertion of all the terminal-attached electric wires 3 into the electric wire insertion portion 214 in S14 will end a series of control steps in FIG. 4. In this manner, each terminal-attached electric wire 3 is accommodated and held in the accommodating region R. Subsequently, a cover (not illustrated) is attached to the back of the housing 2, and a necessary attachment member such as a protector is attached to the connector 1 and the electric wire 32, so as to complete the manufacturing of the connector 1.

As described above, the connector 1 and the wire harness WH according to the present embodiment are provided with the guide portion 215. With this configuration, when the terminal-attached electric wire 3 is inserted into the housing 2 through the electric wire insertion portion 214, it is possible to smoothly assemble the terminal-attached electric wire 3 to the housing 2 while suppressing a situation in which the terminal 31 comes in contact with the inner surface 211A, the adjacent electric wire 32, or the like.

With the connector manufacturing method according to the present embodiment, the terminal-attached electric wire 3 is inserted into the electric wire insertion portion 214 to allow the terminal 31 to abut on the inclined surface 215A of the guide portion 215 so as not to permit the terminal 31 to hit the inner surface 211A, the adjacent electric wire 32, or the like, making it possible to smoothly assemble the terminal-attached electric wire 3 to the housing 2.

Note that the connector, the connector manufacturing method, and the wire harness according to the present embodiment are not limited to the above-described embodiments, and various modifications can be made within the scope described in the claims. The connector 1, the connector manufacturing method, and the wire harness WH according to the present embodiment may be configured by appropriately combining the components of the above-described embodiment and modification.

For example, although the connector 1, the connector manufacturing method, and the wire harness WH according to the above embodiments have been described as a case where the connector 1 and the wire harness WH are mounted on the vehicle, these may be used without being mounted on the vehicle.

With the connector, the connector manufacturing method, and the wire harness according to the present embodiment, the terminal-attached electric wire can be smoothly assembled to the housing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a plurality of terminal-attached electric wires in each of which a terminal is attached to an electric wire in a direction intersecting an extending direction of the electric wire; and a housing including a front surface portion formed in a direction intersecting a fitting direction of the connector to a mating connector, a side wall portion having a frame shape and provided along an outer edge portion of the front surface portion, an internal space defined by the front surface portion and the side wall portion and capable of accommodating the plurality of terminal-attached electric wires arrayed along the front surface portion, a plurality of compartments each of which accommodates and holds the terminal of the plurality of arrayed terminal-attached electric wires in the fitting direction, and a plurality of electric wire insertion portions each having a cylindrical shape and provided to penetrate the side wall portion and configured to extract the electric wires of the plurality of terminal-attached electric wires from the internal space in the direction intersecting the fitting direction, wherein the housing includes a guide portion provided between the terminal-attached electric wires and elongated in the direction intersecting the fitting direction, the guide portion includes an inclined surface inclined with respect to the extending direction of the electric wire, and the inclined surface is inclined so as to be separated from an inner surface of the front surface portion from the electric wire insertion portion toward the compartment.

2. A connector manufacturing method comprising:

an electric wire insertion step of sequentially inserting a plurality of terminal-attached electric wires into a housing through a plurality of electric wire insertion portions each having a cylindrical shape; and an electric wire installation step of arraying the terminal-attached electric wire inserted through the electric wire insertion portion in an accommodating region of an internal space of the housing, and accommodating a terminal of the terminal-attached electric wire in a compartment provided in the housing in a direction intersecting an insertion direction of the electric wire insertion portion, wherein the terminal-attached electric wire is obtained by attaching the terminal to an electric wire in a direction intersecting an extending direction of the electric wire, the housing laterally arrays the plurality of terminal-attached electric wires in the internal space, and forms a guide portion between each accommodating region of the plurality of terminal-attached electric wires, the guide portion includes an inclined surface inclined with respect to the extending direction of the electric wire, the inclined surface is inclined so as to be separated from the compartment from the electric wire insertion portion toward the compartment, the electric wire insertion step includes inclining the terminal to abut on the inclined surface of the guide portion while inserting the each of the terminal-attached electric wires through a respective one of the electric wire insertion portions such that the guide portion allows the terminal to be inserted into the electric wire insertion portion and separated from the compartment.

3. A wire harness comprising:

a plurality of electric wires; and a connector including a housing that allows insertion of the plurality of electric wires and holds the electric wires, the connector configured to be able to connect to a mating connector, wherein the plurality of electric wires constitutes a plurality of terminal-attached electric wires in each of which a terminal is attached in a direction intersecting an extending direction, the housing includes:

a front surface portion formed in a direction intersecting a fitting direction of the connector to the mating connector;

a side wall portion having a frame shape and provided along an outer edge portion of the front surface portion;

an internal space defined by the front surface portion and the side wall portion and capable of accommodating the plurality of terminal-attached electric wires arrayed along the front surface portion;

a plurality of compartments each of which accommodates and holds the terminal of the plurality of arrayed terminal-attached electric wires in the fitting direction; and a plurality of electric wire insertion portions each having a cylindrical shape and provided to penetrate the side wall portion and configured to extract the electric wires of the plurality of terminal-attached electric wires from the internal space in the direction intersecting the fitting direction, the housing includes a guide portion provided between the terminal-attached electric wires, the guide portion elongated in the direction intersecting the fitting direction and, the guide portion including an inclined surface inclined with respect to the extending direction of the electric wire, and the inclined surface is inclined so as to be separated from an inner surface of the front surface portion from the electric wire insertion portion toward the compartment.

* * * * *